United States Patent [19]

Scherer

[11] Patent Number: 4,691,666
[45] Date of Patent: Sep. 8, 1987

[54] LIQUID HEATER WITH CLOSED LOOP HEAT TRANSFER SYSTEM

[75] Inventor: Richard M. Scherer, Niles, Mich.

[73] Assignee: Stratus Corporation, South Bend, Ind.

[21] Appl. No.: 878,294

[22] Filed: Jun. 25, 1986

Related U.S. Application Data

[63] Continuation-in-part of Ser. No. 605,239, Apr. 30, 1984, Pat. No. 4,660,542.

[51] Int. Cl.⁴ .................................................. F22B 1/02
[52] U.S. Cl. ............................. 122/33; 122/408 GT; 237/64
[58] Field of Search .............. 122/32, 33, 34, 408 GT; 237/60; 110/234

[56] References Cited

U.S. PATENT DOCUMENTS

| | | | |
|---|---|---|---|
| 1,959,214 | 5/1934 | Osenberg | 122/33 |
| 4,116,167 | 9/1978 | Hamilton | 122/33 |
| 4,482,004 | 11/1984 | Grover | 122/33 X |
| 4,485,865 | 12/1984 | McCurley | 122/33 X |

*Primary Examiner*—Edward G. Favors
*Attorney, Agent, or Firm*—Leydig, Voit & Mayer

[57] ABSTRACT

A system for heating large volumes of liquid in an industrial or commerical tank. The system includes a gas fired heat generating sender located adjacent the tank, a heating element or receiver means located in the tank, and a closed loop heat transfer circuit having a heating and vaporization zone within which a working fluid is heated and vaporized by the heat generating sender. The closed loop heat transfer circuit also includes a condensation zone which is located within the receiver and within which the vapor is circulated and condensed for transferring heat to the receiver and the liquid in the tank. The sender includes a radiant burner whose products of combustion are exhausted downwardly past a liquid inlet line to preheat the liquid before the liquid enters the tank for subsequent heating by the working fluid in the receiver.

12 Claims, 5 Drawing Figures

LIQUID HEATER WITH CLOSED LOOP HEAT TRANSFER SYSTEM

CROSS-REFERENCE TO A RELATED APPLICATION

This application is a continuation-in-part of application Ser. No. 605,239, filed Apr. 30, 1984, now U.S. Pat. No. 4,660,542.

BACKGROUND OF THE INVENTION

This invention relates generally to a system for heating liquid contained in a tank or other vessel and, more specifically, to a system which is particularly adapted for industrial, commercial or institutional use for heating relatively large volumes of liquid. The system may, for example, be a water heating system, a milk sterilizer, a chemical processing system or any similar system requiring the heating of large volumes of liquid.

In many large liquid heating systems, steam is generated at a central heating plant and is distributed through several pipes to various tanks in which the liquid is heated. Because all of the pipes must be kept hot regardless of whether or not heat is required by a particular tank, a significant percentage of the heat generated at the central plant is lost through the distribution system and is not efficiently utilized to heat the liquid in the tank.

SUMMARY OF THE INVENTION

One aim of the present invention is to provide a large liquid heating system which operates with significantly greater efficiency than systems in which a central heating plant serves several utilization tanks.

Another object of the invention is to heat the liquid in the tank with a recirculating working fluid that more efficiently permits energy not utilized for actual heating to be retained in the system.

Still another object is to provide a closed loop fluid transfer system in which the heat generating means is closely associated with but is separable from the heat exchanger in the tank so as to reduce distribution losses while enabling a heat generating means of standardized and economical design to be used with different designs of heat exchangers.

A further object is to provide a closed loop fluid transfer system having a gas fired radiant burner which not only heats the working fluid of the closed loop system but also preheats the liquid flowing into the heating tank so as to increase the efficiency of the overall system.

The invention also resides in the unique relation of the radiant burner to conduit means for carrying the working fluid and to conduit means for carrying the liquid to be heated.

These and other objects and advantages of the invention will become more apparent from the following detailed description when taken in conjunction with the accompanying drawings.

DETAILED DESCRIPTION OF THE PREFERRED EMBODIMENT

Figure 1:
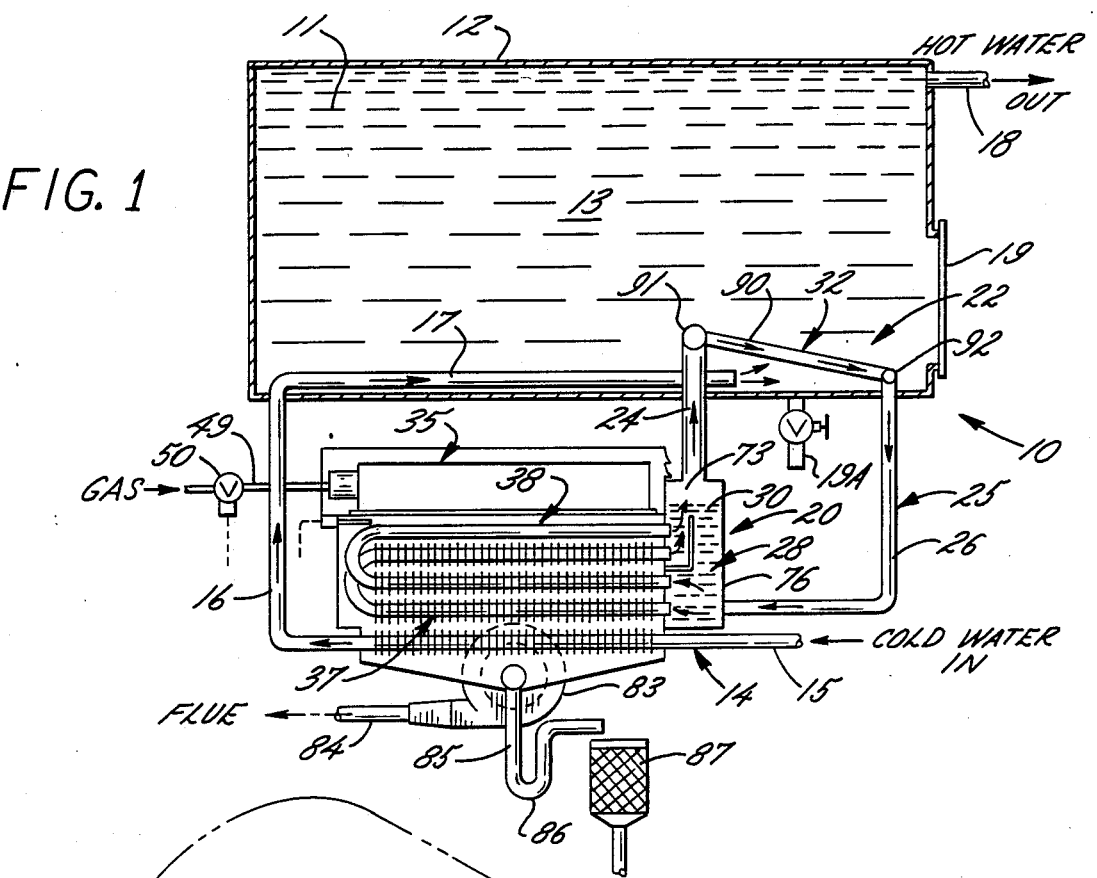
FIG. 1 is a side elevational view which schematically illustrates a new and improved liquid heating system incorporating the unique features of the present invention, certain parts being broken away and shown in section.

For purposes of illustration, the invention has been shown in the drawings in connection with a system 10 particularly adapted for industrial or commercial use in heating a relatively large volume of liquid 11. The liquid is contained in and is adapted to flow through a large closed vessel which herein has been shown as being a heat-insulated tank 12 defining a chamber 13 for the liquid. While the tank could be a milk sterilizer, a chemical processing vat or any other vessel for holding virtually any liquid to be heated, the present tank forms part of an industrial hot water heater and thus the liquid 11 in the tank is water which is adapted to be heated to a high temperature.

Cold water under pressure is admitted into the tank 12 by way of an inlet conduit 14 which has been shown schematically as being of generally U-shaped configuration and having a lower horizontal leg 15, a vertical leg 16 and an upper horizontal leg 17. The vertical leg 16 extends into the bottom of the tank 12 adjacent the rear end thereof while the upper horizontal leg 17 extends forwardly from the vertical leg and along the upper side of the bottom of the tank. Hot water is discharged from the tank by way of an outlet conduit 18 preferably located at the upper forward portion of the tank. A conventional clean-out door 19 is located at the front of the tank while a conventional drain pipe 19A extends from the bottom of the tank.

In accordance with the present invention, the liquid heating system 10 includes a heat generator or sender 20 located adjacent the tank 12, heating element or receiver means 22 preferably located in the tank, and coupling means in the form of delivery and return conduits 24 and 26, respectively, connecting the sender to the receiver. As shown schematically in FIGS. 1 and 2, the heating system has a closed loop heat transfer circuit 25 which includes a heating and vaporization zone 28 located in the sender 20 wherein a working fluid 30 (FIG. 1) is heated and vaporized. The conduit 24 serves a vapor and supply line communicating between the heating and vaporization zone 28 and a condensation zone 32 defined within the heating element means 22 and within which circulating vapor condenses to release and transfer heat of condensation to the heating element means. The conduit 26 serves as a return line for delivering condensate from the heating element means 22 to the heating and vaporization zone 28 for reheating and vaporization. During heating, the working fluid 30 expands. The working fluid then contracts upon being condensed. Such expansion and contraction, together with gravity, maintains a constant fluid flow from the heating and vaporization zone 28 in the sender to the condensation zone 32 at the heating element means 22 and then back to the heating and vaporization zone.

In keeping with the invention, the sender or heat generator 20 operates as a high efficiency gas fired vaporizer and comprises one or more gas fired heating units 35 (FIGS. 1, 3 and 4) and a plurality of working fluid transfer tubes 37 and 38 that form part of the heating and vaporization zone 28 of the closed loop heat transfer circuit 25. As shown in more detail in FIGS. 3 and 4, the sender 20 includes a lower housing 40 preferably molded of an insulating material and supported by an upper frame 42. In this particular instance, the sender includes two identical heating units 35 which also are supported by the frame 42 in side-by-side relation (see FIG. 4). It will be appreciated that a single heating unit could be used or that more than two heating units could be employed depending upon the size of the tank 12. The two heating units preferably are constructed as identical modules.

Herein, each heating unit 35 includes a burner 44 (FIGS. 3 and 4) in the form of a flat and porous tile slab, such as that commercially available from Swanke GmbH, Bremerhavener Strabe 43, Postfach 620 249, D-500 Koln 60, West Germany. The slab permits the uniform passage of gaseous fuel introduced from the top side thereof through the tile for burning with a small flame, on the order of a few thousandths of an inch, on the underside thereof and with a relatively high temperature gradient between the bottom and top sides. Each burner 44 has a rectangular shape extending substantially the length of the sender 20 and is supported by the frame 42 so as to define air passageways 46 (FIG. 4) about the opposed long sides thereof.

In order to supply an air/fuel mixture to the top side of each burner 44, a gas discharge nozzle 48 (FIG. 3) supplied from a gas line 49 with a control valve 50 (FIG. 1) is disposed above the burner 44 at one end thereof, the frame 42 being formed with an air inlet 52 (FIG. 3) at the opposite end of the burner. The discharge nozzle 48 is supported by a U-shaped bracket 53 adjacent a venturi tube 55 of circular cross-section. The venturi tube has an inlet 56 near the nozzle 48, a reduced diameter venturi throat 57 a relatively short distance from the inlet and a discharge end portion 58 which gradually increases in diameter as it progresses away from the venturi throat.

Each venturi tube 55 is disposed within a mixing plenum 60 (FIG. 4) which encloses the top side of the burner 44. The mixing plenum is defined by upright side panels 61 and by a top panel 62 supported above the venturi tube 55, the panels extending substantially the length of the burner 44.

Figure 3:
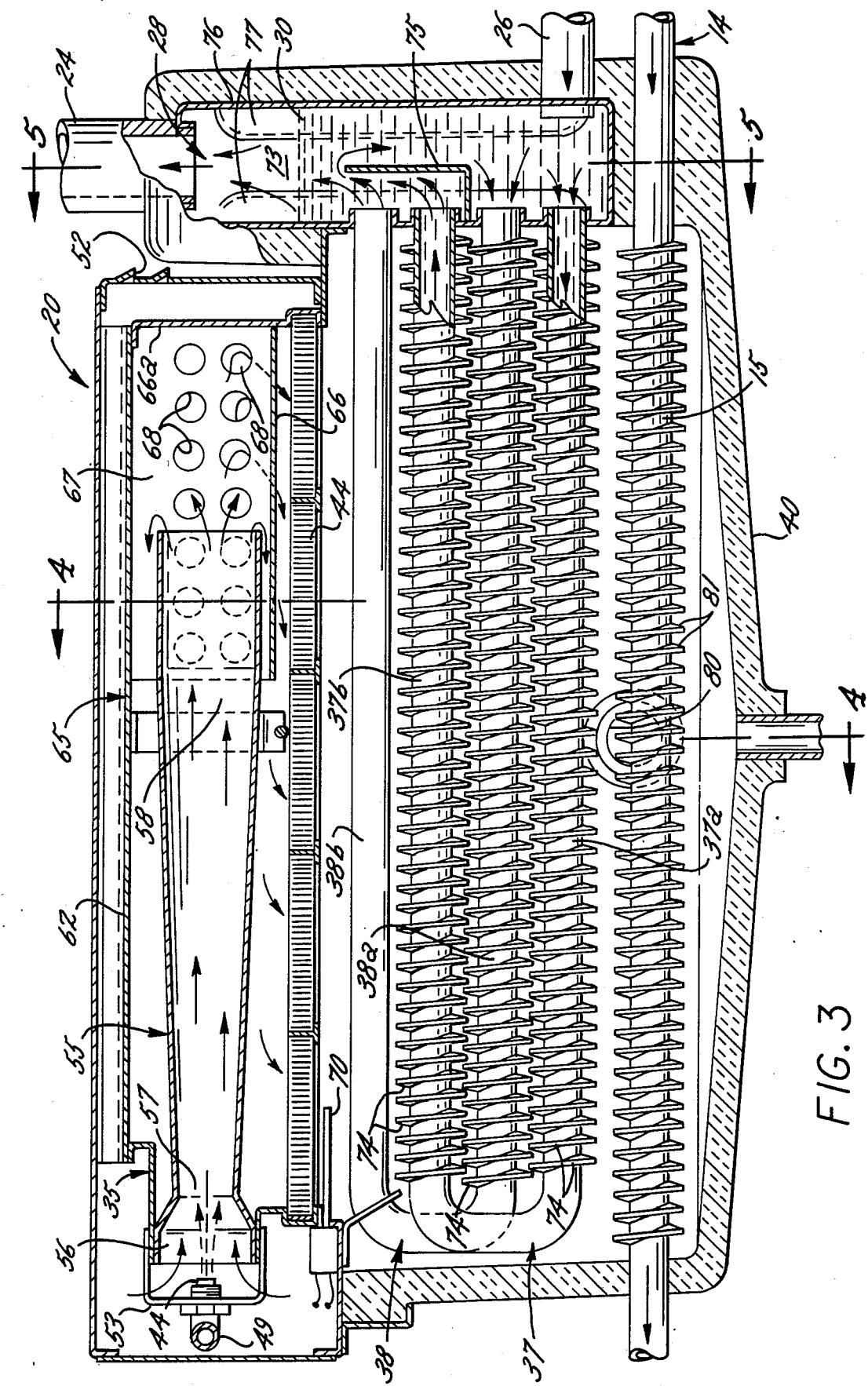
FIG. 3 is an enlarged fragmentary longitudinal cross-sectional view of the heat generating means of the system shown in FIGS. 1 and 2.

As shown in FIG. 3, the discharge end portion 58 of each venturi tube 55 is disposed within the open end of a gas distributing baffle 65 comprising a bottom panel 66 located between the discharge end portion of the venturi tube and the upper side of the burner 44. The baffle 65 includes a forward end panel 66a and further includes side panels 67 extending along and upstanding from the side margins of the bottom panel 66, the baffle being closed at its top by the top panel 62 of the plenum 60. Apertures 68 are formed in the side panels 67 adjacent the discharge end portion 58 of the venturi tube 55 to effect distribution of the gas exiting the tube into the mixing plenum 60.

Figure 4:
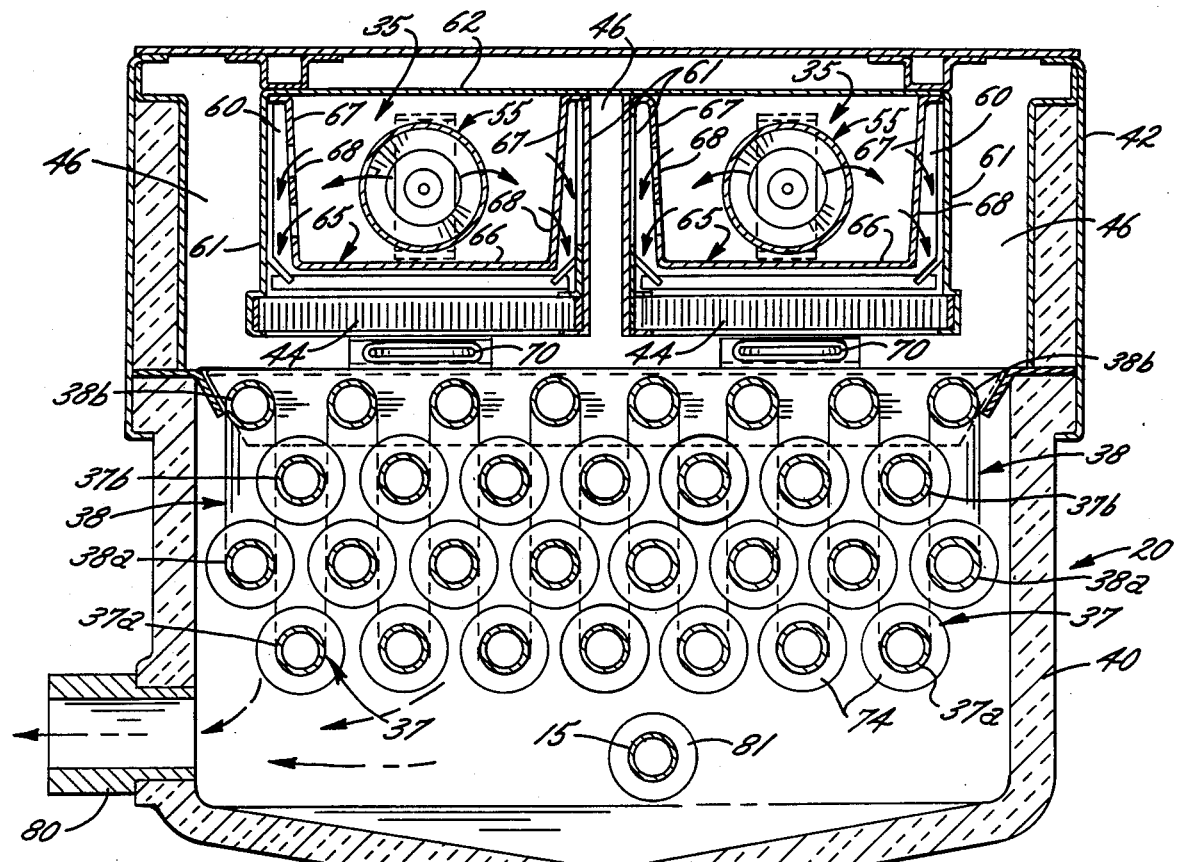
FIGS. 4 and 5 are fragmentary cross-sections taken substantially along the lines 4-4 and 5-5 of FIG. 3.

In operation of each burner 44 as best shown in FIGS. 3 and 4, gaseous fuel such as natural or LP gas is directed into each venturi tube 55 from the gas nozzle 48. The venturi tube develops a high velocity gas flow through and out of the discharge end portion 58 of the tube. This, together with the thermal draw from the burner 44, creates an air flow inwardly through the air inlet 52 of the sender 20. Gas exiting the distribution baffle apertures 68 will mix with the incoming air, flow around the plenum 60 and be distributed uniformly along the top side of the burner 44. The gas then flows downwardly in a uniformly controlled manner through the porous tile burner 44 and burns with a minute flame on the underside thereof. At the same time, a portion of the air drawn into the inlet 52 of the sender 20 passes around the outside of the plenum 60 and through the passageways 46 on opposite sides of the burner 44, thereby restricting upward flow of heat from the burner as well as restricting excessive heating of the sides of the sender housing 40 and frame 42. Preferably, approximately twice the quantity of air necessary for combustion is drawn into the sender 20 with about one-half of the air entering the mixing plenum 60 and the other half passing through the air passageways 46.

To ignite each burner 44 upon start up, a hot surface igniter 70 (FIG. 3) of a known type is provided. Herein, an igniter is located adjacent the rear end of each burner 44 on the lower side thereof and is associated with an appropriate electronic control (not shown) so that, upon start up, the igniter glows at a high temperature to initiate a flame on the burner 44. The igniter then is de-activated. A thermostatic control responsive to the temperature of the water 11 in the tank 12 coacts with the electronic control to start up and shut down the burner by effecting opening and closing of the gas valve 50. The two burners may either be operated simultaneously or may be staged depending upon the heating requirements of the tank 12. If desired, the igniter may be omitted from one burner and that burner may be ignited by the flame of the other burner.

In a typical operation of each burner 44, if propane gas is introduced into the sender 20 at a rate of 0.227 cfm (about 1/7 lb. per hour), air is drawn into the sender at a rate of about 10.4 cfm (about 46 lb. per hour) with approximately one-half of the air mixing with the gas in the mixing plenum 60 and passing through the burner and the other half of the air passing about the sides of the burner. In such case, each burner generates on the order of 34,000 BTU per hour, creating a temperature gradient of approximately 1500° F. across the burner, with the lower surface thereof having a temperature of about 1700° F., while the top surface thereof is only at a temperature of about 200° F. Such operation of the burner 44 will effectively and efficiently heat the working fluid 30 in the transfer tubes 37 and 38 immediately below the burner causing the fluid to vaporize and circulate through the closed loop circuit 25. Air drawn into the sender from the inlet 52 not only is aspirated into the inlet end of the venturi tube 55 to provide the combustion air for the fuel, but also facilitates mixing and distribution of the gaseous fuel and picks up heat which would otherwise be lost from the burner and directs it through the sender. The simultaneous air flow about the sides of the burner also prevents excessive heating of the sender housing 40 and frame 42 which permits a more compact sender design.

To facilitate heating and vaporization of the working fluid 30 in the heating and vaporization zone 28, the transfer tubes 37 and 38 are generally U-shaped as shown in FIG. 3. Herein, there are seven laterally spaced tubes 37 (see FIG. 4) and each includes a lower leg 37a and an upper leg 37b. There are eight laterally spaced tubes 38 each having a lower leg 38a and an upper leg 38b. The tubes 37 and 38 are disposed in parallel relation to the lower sides of the burners 44 and alternate with one another laterally across the burners. The tubes 37 are lower tubes while the tubes 38 are upper tubes. Thus, the lower legs 37a of the lower tubes 37 are located below the lower legs 38a of the upper tubes 38 while the upper legs 37b of the lower tubes 37 are located between the lower and upper legs 38a and 38b of the upper tubes 38. This staggered arrangement enables a large number of tubes to be located in a relatively small space.

Figure 5:
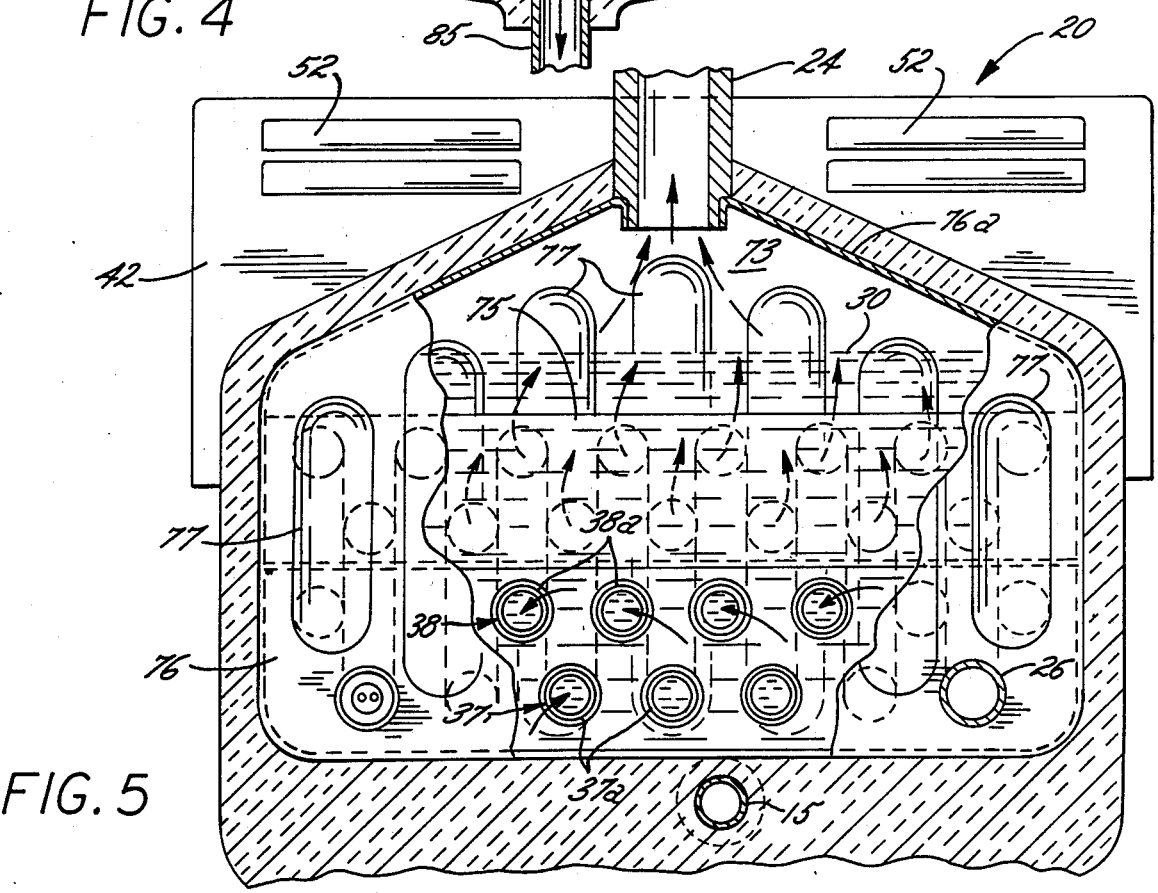

The legs of each tube 37,38 are connected together at one end by a U-turn and have their opposite open ends connected to a vaporization chamber 73 (FIGS. 3 and 5) which typically during operation of the burners 44 is at least half filled with a liquid phase of the working fluid 30. The ends of the lower legs of the tubes 37 and 38 preferably extend into the vaporization chamber 73 to a point below the level of the liquid phase of the working fluid. Since the upper legs 37b, 38b of the transfer tubes 37, 38 are in closer relation to the burner 44 and are subjected to greater radiant energy than the lower legs 37a, 38a, a directional flow is imparted to the working fluid in the transfer tubes as shown by the arrows in FIG. 3. Vapor generated during such heating is emitted out of the open ends of the upper legs 37b, 38b while liquid phase working fluid enters the transfer tubes through the open ends of the lower legs 37a, 38a. The vapor generated during heating exits the chamber 73 into the vapor supply line 24, coupled to the top of the chamber 73, as best shown in FIGS. 3 and 5, and flows to the heating element means 22 of the closed loop circuit 25. The hot vapor entering the heating element means 22 will cause heat transfer to the tank chamber 13 and the water therein, which in turn will cause condensation of the vapor, releasing additional heat of condensation for utilization in the water heating operation.

The working fluid that condenses in the heating element means 22 drains to the condensate return line 26 (FIGS. 1 to 3) and returns to the bottom of the condensation chamber 73. The condensate enters the lower legs 37a, 38a of the tubes 37 and 38 and is reheated and revaporized as it passes through the tubes. The legs 37a, 37b and 38a all are formed with a plurality of heat receiving fins 74 (FIG. 3) which are exposed to the hot products of combustion emitted from the burners 44. The upper legs 38b of the upper tubes 38 are located closely adjacent the flame at the lower sides of the burners 44 and, to save expense, the fins are omitted from the upper legs 38b.

An L-shaped baffle 75 (FIG. 3) is located in the condensation chamber 73 in opposing relation with the upper legs 37b and 38b of the tubes 37 and 38. The baffle directs the vapor phase of the working fluid upwardly and tends to cause any liquid phase working fluid discharged from the legs 37b and 38b to return to the bottom of the chamber 73 for immediate recirculation through the tubes. The chamber 73 is formed by a metal shell 76 whose top 76a tapers upwardly as shown in FIG. 5 to direct vapor toward the conduit 24. The end walls of the shell are formed with inwardly depressed ribs 77 to increase the pressure resistance of the shell.

Only a relatively low volume of working fluid 30 is required and thus comparatively little heat is lost through the working fluid itself. The working fluid can be selected for the desired temperature range required at the heating element means 22. Although water may be used as a working fluid, working fluids with higher boiling points are preferred. For example, various aliphatic or paraffinic oils, mineral salts, and metals have relatively high boiling points which could be used at high temperatures without the generation of pressures which would require special strength design considerations in the closed loop heat transfer circuit 25. Although the working fluid 30 is sealed in the closed loop circuit 25, it preferably should be nontoxic in order to guard against danger from accidental leakage. Prior to introducing the working fluid into the closed loop circuit during initial charging of the system, the closed loop circuit should be evacuated so as to eliminate air and possible contaminates.

Since the closed loop circuit 25 is maintained in a sealed condition after charging with the working fluid 30, the working fluid may be utilized for prolonged periods without accumulation of contaminates, mineral build up, or the necessity for regular replenishment. It also will be appreciated by one skilled in the art that the closed loop heat transfer circuit 25 may be operated with lesser energy losses than conventional water heating equipment, and thus higher energy utilization efficiencies. In addition to the efficiencies achieved from the relatively direct transfer of energy from the burners 44 to the working fluid 30 in the vaporization zone 28 of the sender 20, energy in the form of hot condensate in the condensation zone 32, which is not utilized during the heating operation and typically lost in conventional systems, is returned to the sender and retained in the closed loop heat transfer circuit. During the off cycles of the burners 44, the tiles act as a damper to prevent the upward escape of heat from the fluid transfer tubes 37 and 38. Since the working fluid 30 in the closed loop circuit 25 will have precise vapor vs. temperature characteristics, the heating operation can be controlled and monitored with relative precision. The liquid levels of the working fluid in the closed loop circuit also can be predictably designed to achieve the desired heat transfer characteristics.

In accordance with another important aspect of the invention, the overall efficiency of the system 10 is increased significantly by using the hot products of combustion from the burners 44 to preheat the cold water in the inlet line 14 before such water enters the tank 12. For this purpose, the lower horizontal leg 15 of the inlet line 14 extends through the housing 40 at a position below the fluid transfer tubes 37 and 38 and at a location adjacent the bottom of the housing 40 (see FIGS. 3 and 4). Products of combustion from the burners 44 are drawn downardly within the housing and pass by the inlet line leg 15 before exiting the housing 40 through an exhaust pipe 80 at the side of the housing adjacent the bottom thereof as shown in FIG. 4. The hot flue gases heat the water in the inlet line leg 15 and thus increase the temperature of the incoming water before the water is delivered into the tank 12 via the inlet line legs 16 and 17. More effective heat transfer from the flue gases to the inlet line leg 15 is achieved by forming the latter with heat-absorbing fins 81 as shown in FIG. 3.

To effect downward flow of the flue gases past the inlet line leg 15 and toward the exhaust pipe 80, a power-operated induction blower 83 (FIGS. 1 and 2) is connected to the exhaust pipe. Flue gases sucked out of the housing 40 by the blower are exhausted to a main flue by way of a discharge pipe 84.

As the hot flue gases pass by and lose heat to the inlet line leg 15, water in the flue gases condenses. To dispose of the condensate, a drain line 85 (FIG. 1) extends from the bottom of the housing 40 and directs the condensate through a P-trap 86 before the condensate discharges through a filter 87 to the sewer.

By virtue of drawing the flue gases out of the lower end portion of the housing 40 and using the flue gases to preheat the water in the inlet line leg 15, the efficiency of the overall system 10 may be as high as 96%. If the water is not preheated, the sender 20 may be inverted such that the fluid transfer tubes 37 and 38 are disposed above the burners 44 and are heated by an upwardly directed flame. In such a case, the flue gases are exhausted by natural convection from the top of the housing 40 but the efficiency of the overall system may be reduced to about 85%.

Figure 2:
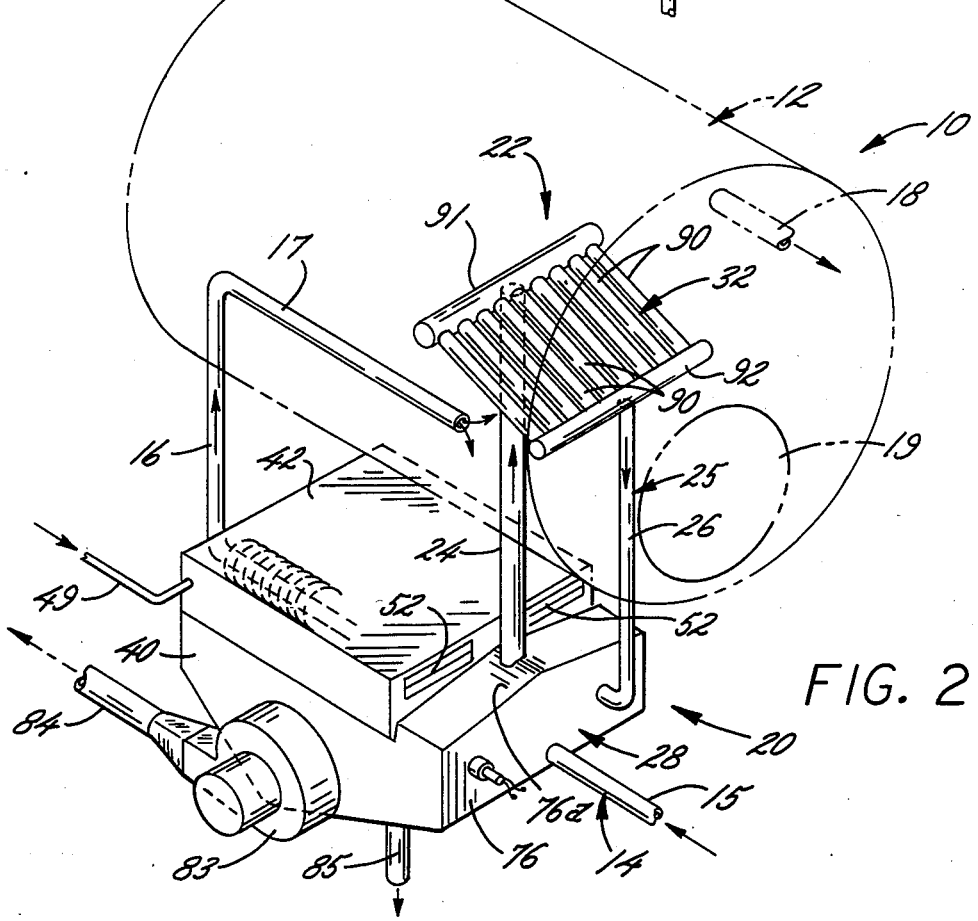
FIG. 2 is a schematic perspective view of the system shown in FIG. 1.

The receiver or heating element means 22 may take various forms, a preferred form being shown in FIGS. 1 and 2. As illustrated, the heating element means comprises a series of laterally spaced tubes 90 located near the bottom of the tank 12 adjacent the forward end thereof and just above the discharge end of the upper horizontal inlet leg 17. The tubes 90 are inclined downwardly and forwardly and, at their upper ends, are connected to an upper manifold 91 which communicates with the working fluid supply conduit 24. Working fluid 30 in vapor form delivered through the conduit 24 flows into the tubes 90 by way of the manifold 91 and heats the water 11 as it condenses in the condensation zone 32 defined within the tubes. Condensate flows downwardly within the downwardly inclined tubes, is collected by a manifold 92 at the lower ends of the tubes, and then is discharged to the return conduit 26 for recirculation to the heating and vaporization zone 28. Condensation of the working fluid in the tubes 90 is effected by the low temperature water spilling out of the discharge end of the inlet line leg 17 and flowing upwardly past the spaced tubes.

From the foregoing, it will be apparent that the present invention brings to the art a new and improved system 10 in which the liquid 11 in the tank 12 is heated by a closed loop fluid transfer circuit 25 which enables the sender 20 to be located in proximity to the tank while the receiver 22 is located in the tank. Because the sender is located adjacent the tank, distribution losses are relatively low. Moreover, the sender applies heat directly to the comparatively small volume of working fluid 30 rather than the larger volume of liquid 11 in the tank and thus, during off cycles when the liquid 11 does not require heat, very little energy is lost by way of the small volume of working fluid. By virtue of the incoming liquid 11 being preheated by the flue gases, the overall system is very energy efficient.

I claim:

1. A system for heating liquid and comprising a closed vessel defining a chamber for receiving liquid to be heated, heating element means disposed within said chamber, heat generating means located outside of said chamber, said heating element means forming part of a sealed closed loop circuit within which a working fluid is circulated for transferring heat from said heat generating means to said heating element means, said closed loop circuit including a heating and vaporization zone within which said working fluid is heated by said heat generating means and within which at least a portion of the heated working fluid is converted to vapor, said closed loop circuit further including a condensation zone within said heating element means and within which at least a portion of said vapor is condensed to cause heat to be transferred from said working fluid to said heating element means and to the liquid in said chamber, said heating element means comprising a series of laterally spaced and downwardly inclined tubes located in said chamber between the upper and lower ends of said chamber, a first manifold communicating with the upper ends of said tubes for delivering vapor from said heating and vaporization zone to said tubes, a second manifold communicating with the lower ends of said tubes for returning condensate from said tubes to said heating and vaporization zone, an inlet conduit for admitting a supply of low temperature liquid into the lower end portion of said chamber for upward flow past said heating element means, and an outlet conduit for discharging a supply of heated liquid out of the upper end of said chamber.

2. A system for heating liquid and comprising a vessel defining a chamber for receiving liquid to be heated, an inlet conduit for admitting a supply of low temperature liquid into said chamber, an outlet conduit for discharging a supply of heated liquid out of said chamber, heating element means disposed within said chamber, a gas fired radiant burner having upper and lower surfaces, said heating element means being tubular and forming part of a sealed closed loop circuit within which a working fluid is circulated for transferring heat from said radiant burner to said heating element means, said closed loop circuit including a heating and vaporization zone within which said working fluid is heated by said radiant burner and within which at least a portion of the heated working fluid is converted to vapor, said closed loop circuit further including a condensation zone within said tubular heating element means and within which at least a portion of said vapor is condensed to cause heat to be transferred from said working fluid to said heating element means and to the liquid in said chamber, first conduit means for delivering vapor from said heating and vaporization zone to said heating element means, second conduit means for returning condensate from said heating element means to said heating and vaporization zone, said closed loop circuit having a plurality of working fluid transfer tubes communicating with said first and second conduit means and disposed in parallel and downwardly spaced heat transfer relation with the lower surface of said radiant burner, means for directing controlled quantities of gaseous fuel uniformly on the upper surface of said burner, said burner having means permitting the flow of said fuel downwardly through the burner for burning with a high intensity flame on said lower surface of said burner, a housing enclosing said burner and said fluid transfer tubes, and means at the lower end portion of said housing for exhausting products of combustion of said burner from said housing.

3. A system as defined in claim 2 in which said inlet conduit extends within said housing at a location between said burner and said exhausting means whereby low temperature liquid flowing through said inlet conduit is preheated by said products of combustion before such liquid is delivered to said chamber.

4. A system as defined in claim 3 in which said inlet conduit extends within said housing at a location between said fluid transfer tubes and said exhausting means.

5. A system for heating liquid and comprising a vessel defining a chamber for receiving liquid to be heated, an inlet conduit for admitting a supply of low temperature liquid into said chamber, an outlet conduit for discharging a supply of heated liquid out of said chamber, heating element means disposed within said chamber, a gas fired radiant burner having upper and lower surfaces, said heating element means being tubular and forming part of a sealed closed loop circuit within which a working fluid is circulated for transferring heat from said radiant burner to said heating element means, said closed loop circuit including a heating and vaporization zone within which said working fluid is heated by said radiant burner and within which at least a portion of the heated working fluid is converted to vapor, said closed loop circuit further including a condensation zone within said tubular heating element means and within which at least a portion of said vapor is condensed to cause heat to be transferred from said working fluid to said heating element means and to the liquid in said chamber, first conduit means for delivering vapor from said heating and vaporization zone to said heating element means, second conduit means for returning condensate from said heating element means to said heating and vaporization zone, said closed loop circuit having a plurality of working fluid transfer tubes communicating with said first and second conduit means and disposed in parallel and downwardly spaced heat transfer relation with the lower surface of said radiant burner, means for directing controlled quantities of gaseous fuel uniformly on the upper surface of said burner, said burner having means permitting the flow of said fuel downwardly through the burner for burning with a high intensity flame on said lower surface of said burner, a housing enclosing said burner and said fluid transfer tubes, means at the lower end portion of said housing for exhausting products of combustion of said burner from said housing, said inlet conduit extending within said housing at a location between said fluid transfer tubes and said exhausting means whereby low temperature liquid flowing through said inlet conduit is preheated by said products of combustion before such liquid is delivered to said chamber.

6. A system as defined in claim 5 in which said heating element means comprise a series of laterally spaced and downwardly inclined tubes located in said chamber between the upper and lower ends thereof, a first manifold disposed within said chamber and communicating with the upper ends of said tubes for delivering vapor from said heating and vaporization zone to said tubes, and a second manifold disposed in said chamber and communicating with the lower ends of said tubes for returning condensate from said tubes to said heating and vaporization zone.

7. A system for heating liquid and comprising a closed vessel defining a chamber for receiving liquid to be heated, heating element means disposed within said chamber, heat generating means located outside of said chamber, said heating element means forming part of a sealed closed loop circuit within which a working fluid is circulated for transferring heat from said heat generating means to said heating element means, said closed loop circuit including a heating and vaporization zone within which said working fluid is heated by said heat generating means and within which at least a portion of the heated working fluid is converted to vapor, said closed loop circuit further including a condensation zone within said heating element means and within which at least a portion of said vapor is condensed to cause heat to be transferred from said working fluid to said heating element means and to the liquid in said chamber, said closed loop circuit further including first conduit means for delivering vapor from said heating and vaporization zone to said heating element means and second conduit means for returning condensate from said heating element means to said heating and vaporization zone, said heating element means being located between the upper and lower ends of said chamber, an inlet conduit for admitting a supply of low temperature liquid into the lower end portion of said chamber for upward flow past said heating element means, an outlet conduit for discharging a supply of heated liquid out of the upper end of said chamber, said heat generating means comprising a gaseous fuel fired radiant burner, said closed loop circuit having a plurality of working fluid transfer tubes communiating with said first and second conduit means and disposed in parallel spaced heat transfer relation relative to one side surface of said radiant burner, means for directing controlled quantities of gaseous fuel uniformly onto an opposite side surface of said burner, said first surface, and said burner having means permitting the flow of said fuel through the burner for burning with a high intensity flame on said one surface.

8. A system as defined in claim 1 in which said first and second manifolds are disposed in said chamber.

9. A system as defined in claim 7 in which said side surfaces are disposed in horizontal planes and said working fluid transfer tubes are disposed in vertically spaced relation to said one side surface.

10. A system as defined in claim 7 in which said working fluid transfer tubes are located below said burner, said directing means being located above said burner for directing said fuel downwardly through said burner for burning on the lower face of said burner.

11. A system as defined in claim 10 further including a housing enclosing said burner and said fluid transfer tubes, means at the lower end portion of said housing for exhausting products of combustion of said burner from said housing, said inlet conduit extending within said housing at a location between said burner and said exhausting means whereby low temperature liquid flowing through said inlet conduit is preheated by said products of combustion before such liquid is delivered to said chamber.

12. A system as defined in claim 11 in which said inlet conduit extends within said housing at a location between said fluid transfer tubes and said exhausting means.

* * * * *